United States Patent [19]

Finney

[11] Patent Number: 5,009,310

[45] Date of Patent: Apr. 23, 1991

[54] DISPOSABLE CONTAINER FOR STORING AND DISPENSING PET FOOD

[76] Inventor: Patrick D. Finney, P.O. Box 658, Horsham, Pa. 19044

[21] Appl. No.: 503,907

[22] Filed: Apr. 4, 1990

[51] Int. Cl.$^5$ .................. B65D 69/00; B65D 85/72
[52] U.S. Cl. ...................... 206/229; 220/359; 220/522; 229/1.5 C; 426/115
[58] Field of Search .............. 220/23, 256–258, 220/270, 359, 352, 521, 522; 206/541, 813, 229; 426/115; 229/1.5 C

[56] References Cited

U.S. PATENT DOCUMENTS

| | | | |
|---|---|---|---|
| 1,514,379 | 11/1924 | Fleischer | 229/1.5 C |
| 2,034,067 | 3/1936 | Stone | 229/1.5 C |
| 2,433,926 | 1/1948 | Sayre | 206/229 X |
| 3,080,997 | 3/1963 | Brown | 206/813 X |
| 3,214,074 | 10/1965 | Schechter | 220/257 X |
| 3,335,939 | 8/1967 | Robinson . | |
| 3,381,876 | 5/1968 | Biggins | 206/229 X |
| 3,391,847 | 7/1968 | Chrishme et al. | 220/257 X |
| 3,491,935 | 1/1970 | Trotter . | |
| 3,537,610 | 11/1970 | Bilon | 220/258 |
| 3,547,338 | 12/1970 | Hemmes . | |
| 3,557,998 | 1/1971 | Collie | 220/270 |
| 3,624,787 | 11/1971 | Newman | 220/23 X |
| 3,650,386 | 3/1972 | Tigner . | |
| 3,722,779 | 3/1973 | Chang | 206/229 X |
| 3,783,098 | 1/1974 | Hurst . | |
| 3,847,324 | 11/1974 | Uchanski et al. | 206/813 X |
| 4,044,941 | 8/1977 | Krudsen | 220/258 |
| 4,348,421 | 9/1982 | Sakakibara et al. | 426/115 X |
| 4,453,646 | 6/1984 | Harrild | 220/258 |
| 4,574,174 | 3/1986 | McGonigle | 426/115 X |
| 4,673,601 | 6/1987 | Lamping . | |
| 4,738,374 | 4/1988 | Ingemann | 220/258 |

Primary Examiner—Bryon P. Gehman
Attorney, Agent, or Firm—Terry M. Gernstein

[57] ABSTRACT

The disposable container for storing and dispensing pet food is in the shape of a pet feeding dish and is totally self contained so that the entire meal can be served and the entire unit discarded after use. The unit includes adhesive on the bottom so the dish will not move as an animal eats from the dish, and a cover is included which permits a plurality of such units to be stacked.

2 Claims, 4 Drawing Sheets

DISPOSABLE CONTAINER FOR STORING AND DISPENSING PET FOOD

TECHNICAL FIELD OF THE INVENTION

The present invention relates to the general art of containers, and to the particular field of food containers.

BACKGROUND OF THE INVENTION

House pets come in all sizes, shapes, breeds and colors. Today, there are literally millions of cats and dogs which are kept as house pets. All of these pets must be fed, usually at least once a day. This requires the pet owner to open a pet food container, place the food in the pet's dish and then located that dish in a convenient spot for the pet.

The dish often moves as the animal consumes the food. This dish movement can cause the food to spill onto the surface surrounding and supporting the dish and onto the outside of the dish itself. Such food spillage may make clean up an onerous and time-consuming task.

For this reason, many pet owners do not adequately clean their pet's dish after the animal has finished eating. This is especially true if the owner has been required to take considerable time in preparing the meal and in cleaning the area surrounding the dish.

However, proper pet health generally requires an animal to eat from a clean dish. At any rate, leaving food on a pet's dish is not healthy or aesthetically desirable from the owner's standpoint.

Therefore, there is a need for a means for serving a pet's food in an expeditious manner and which will hold that pet's food while the pet is consuming the food in a manner which minimizes food spillage during such food consumption and which makes clean up as expeditious and as easy as possible.

However, neatness and clean up are not the only considerations involved in feeding a pet. The animal must be able to reach all of the food served to him. Neatness is nearly worthless if the pet cannot eat all of the served food.

Often, a pet owner is required to feed his pet while traveling or camping. This requires the owner to carry the pet's food with him, prepare it and serve it in locations that are not really convenient to preparing and serving such food. This presents an inconvenience to the owner and to the pet.

Therefore, there is a need for a pet food container which makes serving pet food easy and expeditious, yet which permits the pet to consume all of the food served to him in a neat manner, and still permits expeditious clean up after the pet has finished eating.

OBJECTS OF THE INVENTION

It is a main object of the present invention is to provide a pet food container which makes serving pet food easy and expeditious.

It is another object of the present invention to provide a pet food container which makes serving pet food easy and expeditious, yet which permits the pet to consume all of the food served to him in a neat manner.

It is another object of the present invention to provide a pet food container which makes serving pet food easy and expeditious, yet which permits the pet to consume all of the food served to him in a neat manner, and still permits expeditious clean up after the pet has finished eating.

SUMMARY OF THE INVENTION

These, and other, objects are achieved by a disposable pet food container which combines the functions of a food storage container and a food-dispensing dish or bowl whereby food can be stored prior to initial use, and then served in the same container and then disposed of after use.

The container includes adhesive means on the bottom so that it can be held in one place as the animal eats, and can be used to store any food left after the animal has finished his meal, or can be disposed of in a manner that prevents the spread of germs and bacteria. To this end, the container has a special lid that can be placed over the container after the container has initially been opened.

The container thus includes everYthing that is necessary to serve a complete meal for a pet and which makes preparation and consumption of that meal easy, yet which makes clean up easy and expeditious for the pet owner.

BRIEF DESCRIPTION OF THE DRAWING FIGURES

DETAILED DESCRIPTION OF THE PREFERRED EMBODIMENT OF THE INVENTION

Figure 1:
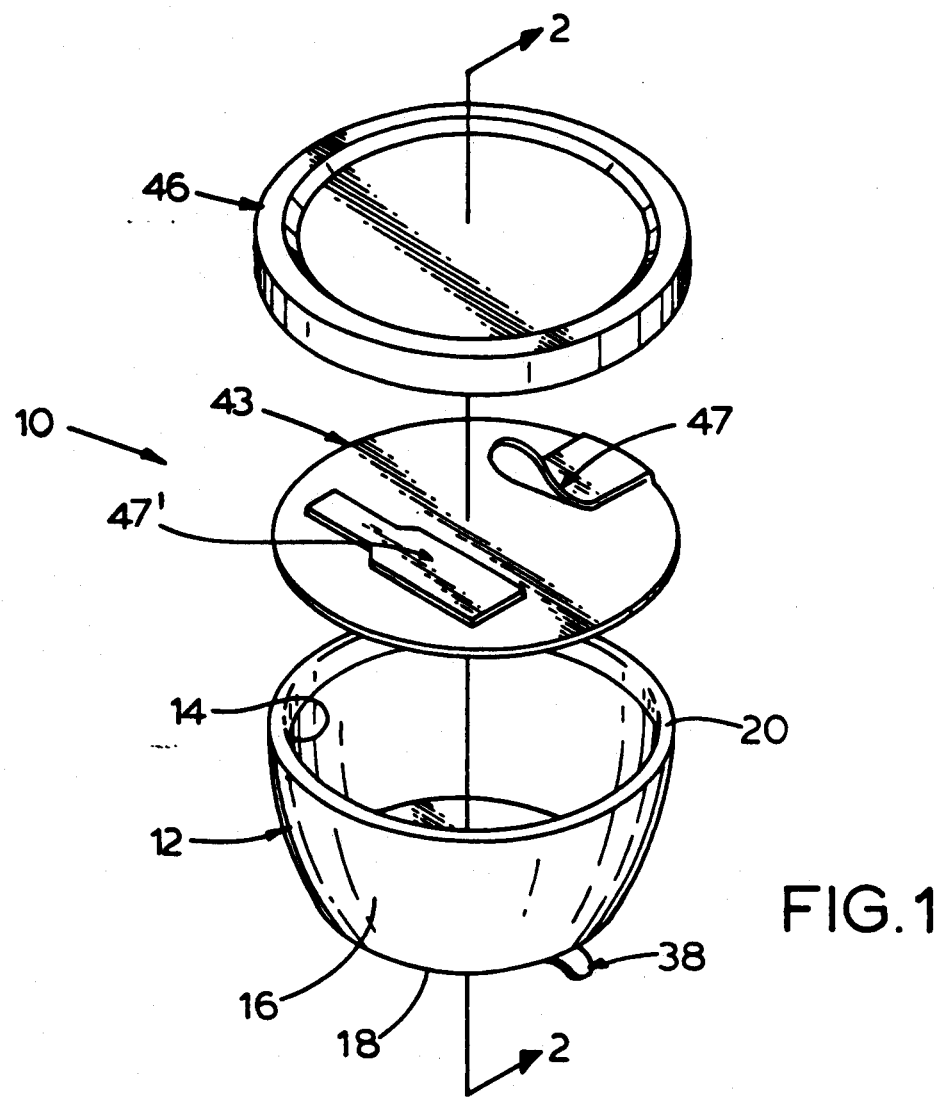
FIG. 1 is a perspective view of the preferred form of the disposable container and feeding dish embodying the present invention.
Figure 2:
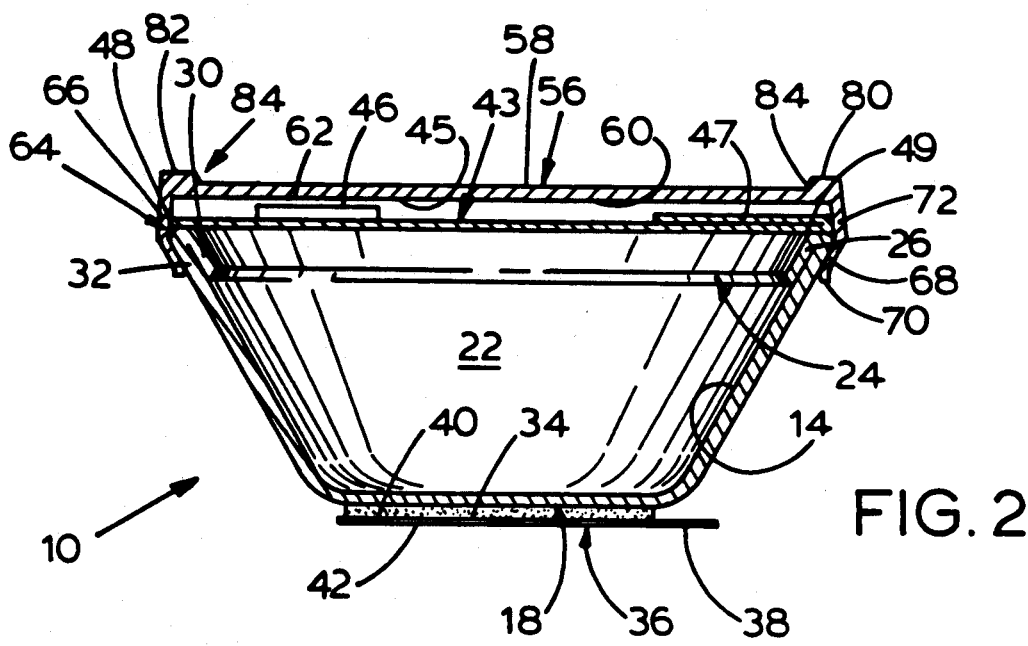
FIG. 2 is a view taken along line 2—2 of FIG. 1.
Figure 3:
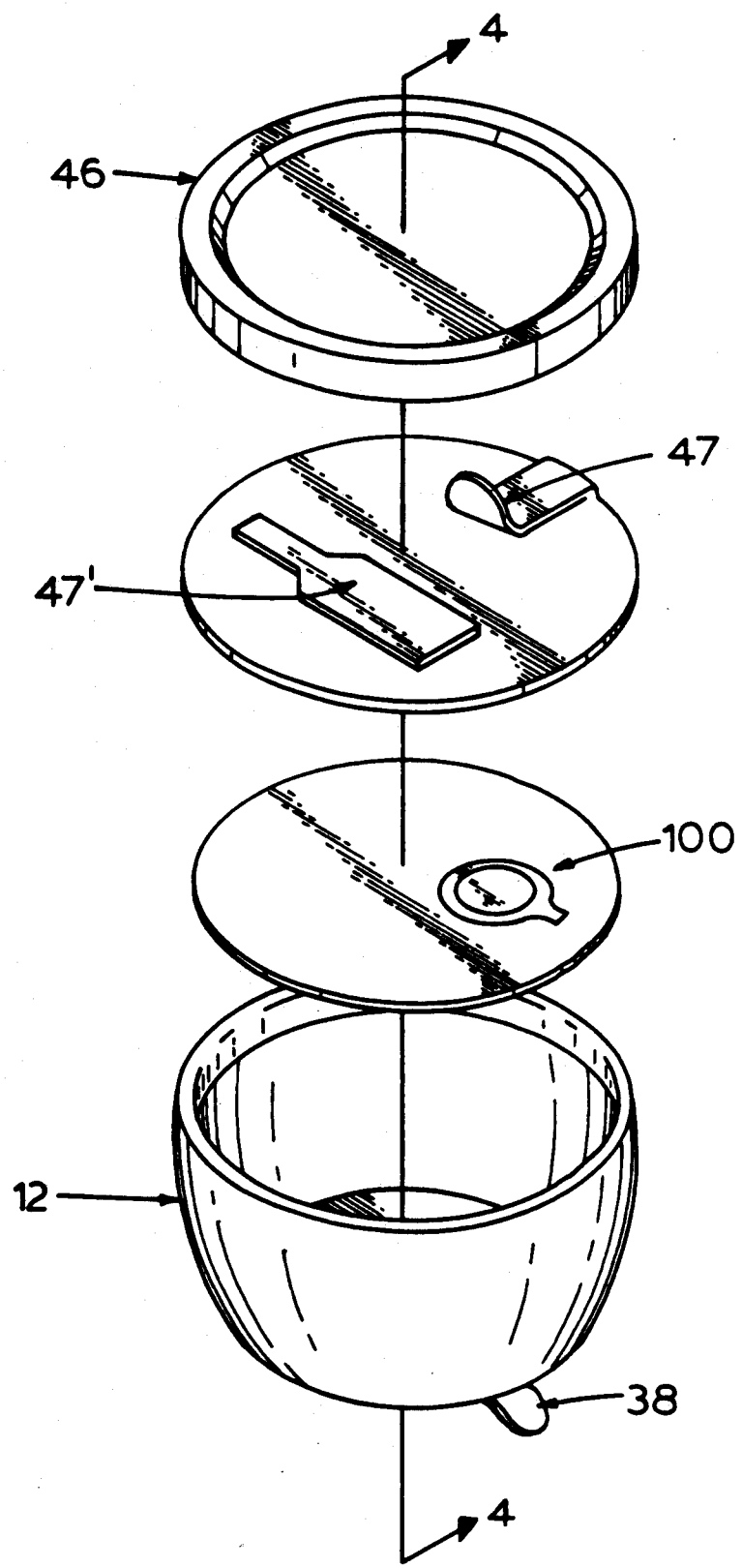
FIG. 3 is a perspective view of another form of the disposable container and feeding dish embodying the present invention.
Figure 4:
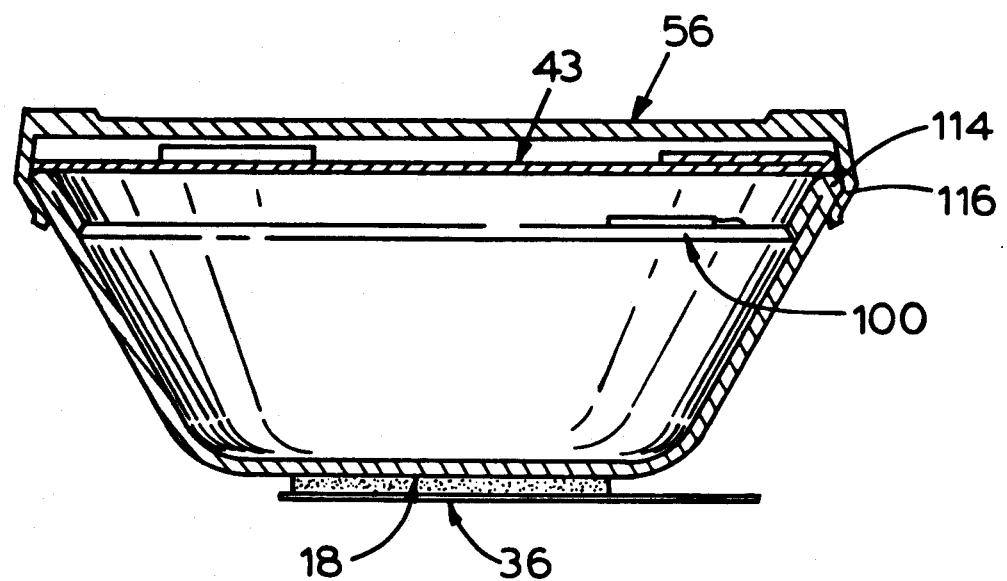
FIG. 4 is a view taken along line 4—4 of FIG. 3.
Figure 5:
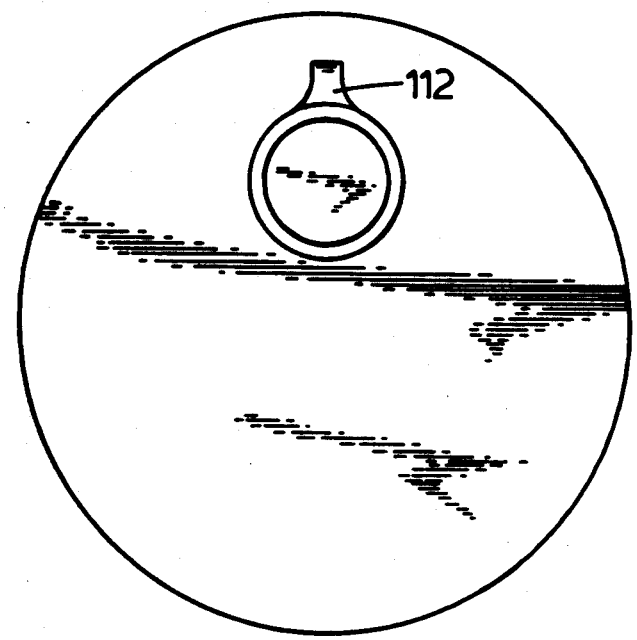
FIG. 5 is a top plan view of a sealing plate used in conjunction with the FIG. 3 disposable container and feeding dish.
Figure 6:
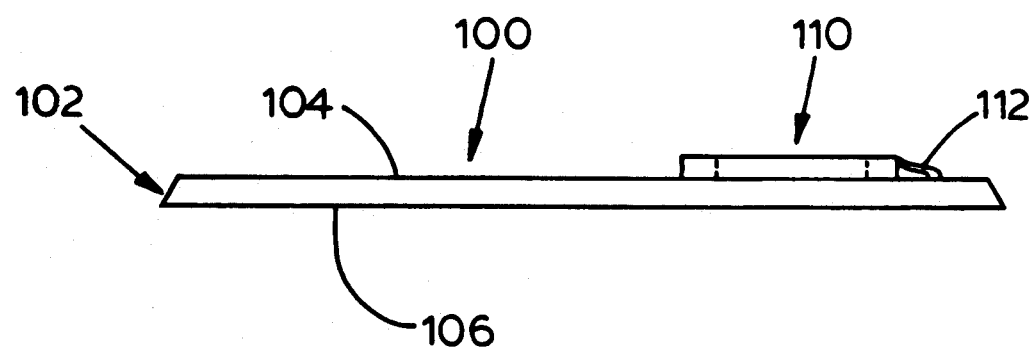
FIG. 6 is a side elevational view of the sealing plate.

Shown in FIGS. 1 and 2 is a disposable pet food container and feeding dish unit 10 embodying the present invention. The unit 10 can be made of any suitable material, including aluminum, plastic or the like, and is sold and used as a unit. The pet owner simply purchases the unit 10, stores it until it is time to feed the pet, opens the unit 10, and places the open unit in a location that is convenient to the pet. The pet eats directly from the unit 10, and the unit is disposed of after the pet has finished eating. Preparation, serving and cleanup are all easy, neat and expeditious for both the pet owner and the pet using the unit 10.

The unit 10 includes a monolithic outer shell 12 includes an inner surface 14 and an outer surface 16. The outer shell is in the shape of a pet's feeding bowl and thus is in the shape of a circular cone that diverges from a base 18 to a top rim 20, with the top rim having an outside diameter that is greater than the outer diameter of the base 18. Food is contained inside the container inner volume 22, and the dish slopes outwardly as best shown in FIG. 2. A triangular ledge 24 is formed on the inside surface of the shell 12 by folding the shell over in a reverse bend 26 at the top rim 20. The ledge circumnavigates the outer shell, and has a hypotenuse 28 that extends from inner layer 30 of the double thickness outer shell downwardly towards the base 18 and toward the outer layer 32 of the double thickness outer shell. The ledge has a thickness dimension as measured along the height of the hypotenuse 28. The purpose of this ledge will be discussed below.

A layer of contact adhesive 34 is positioned on the outer surface of the bottom 18, and a protective covering 36 is placed over that adhesive. The protective covering is circular in outer peripheral shape, and includes a diameter that is greater than the diameter of the adhesive 34. The protective covering also includes a pull tab 38 that extends beyond the outer shell.

The layer of adhesive covers the base and is circular in shape to have a diameter that is slightly less than the outer diameter of the base 18. The adhesive also has a thickness dimension that is measured between the base 18 and the protective cover 36, with the protective cover having a slight thickness itself as measured between inner surface 40 and outer surface 42 thereof. The protective covering is of the type that adheres to the adhesive, but can be easily removed therefrom, and the adhesive is of the type that will securely adhere to a support surface, such as a floor or the like, but can be easily removed therefrom so the dish can be fixed in position for serving the food to the pet, but can be easily removed for disposal.

The unit 10 further includes a sealing cover 43 having a top surface 44 that is located adjacent to the shell inner surface 14 when the sealing cover is mounted on the shell, and an outer surface 45. The cover 43 has a stirring stick 46 releasably mounted on the top surface 44 and a pull tab 47 fixedly mounted on the top surface 44. The stirring stick is held on the sealing cover until the pet owner needs it to stir the pet food, and then can be easily removed from the sealing cover. Suitable adhesive will be known to those skilled in the art, and thus will not be discussed.

The sealing cover is circular in outer peripheral shape and has an outer diameter that is slightly greater than the outer diameter of the outer shell at the top rim so that the sealing cover extends outwardly of the outer shell in an overhang 48 shown in FIG. 2. The overhang is turned under when the cover 56 is placed on the unit, but provides an element that can be grasped to facilitate removal of the sealing cover. The overhang is shown in FIG. 2 in the tucked in condition. The sealing cover 43 is removably mounted to the outer shell top rim 20 by adhesive means 49 located adjacent to the overhang 48, and sealingly covers and closes the unit and the food in the unit. The sealing cover is simply removed using the pull tab 47 or the overhang 48 to open the unit. The sealing cover can also be used as a tamper indicator.

The unit 10 further includes a shell cover 56 that includes a top surface 58 that is located on the outside of the unit when the cover 56 is mounted on the shell as shown in FIG. 2, and a bottom surface 60 that is located inside the unit when the cover 56 is mounted on the shell 12 as shown in FIG. 2. The cover 56 is monolithic and includes a base section 62 which is circular and has an outer diameter that is essentially equal to the outer diameter of the outer shell at the outer shell top rim 20. The cover 56 further includes a tubular sidewall 64 that has a first section 66 located adjacent to the base 62 and a second section 68 having a shell cover rim 70 thereon. A weakened section 72 connects the first section 66 to the second section 68 and is positioned to engage the outer shell top rim adjacent to the outer shell top rim 20 when the cover 56 is mounted on the outer shell.

The cover sidewall is deformed at the weakened section when the cover is mounted on the outer shell so that the cover rim 70 is spaced from the outer shell and curves away from that outer shell. This permits the cover to be easily grasped and pulled upwardly and off of the outer shell to open the unit. The cover sidewall has an inner diameter that is slightly smaller than the outer diameter of the outer shell so that the just-described flexing of that cover sidewall occurs when the cover is mounted on the outer shell. This size difference also contributes to the sealing of the cover onto the outer shell.

The shell cover 56 further includes an annular ridge 80 which is inwardly adjacent to the outer periphery of the shell cover base. The ridge 80 includes a top planar surface 82 and a sloping inner wall 84 that intersects the outer surface 58 of the cover base 56 and defines a circular area 84. The ridge has a depth as measured between the top planar surface 82 and the surface 58 that exceeds the combined thickness of the adhesive and the protective covering 36. The circular area 84 is sized to accommodate the adhesive and the protective covering so that the top planar surface 82 will engage the outer surface of a unit adjacent to the adhesive when one unit is stacked upon another. This will facilitate storing several units in a stacked configuration.

An alternative form of the unit is shown as unit 10' in FIGS. 3–6. The unit 10' is similar to unit 10, but unit 10' further includes a sealing plate 100. The sealing plate is located subadjacent to the sealing cover 43 and serves to cover the food in the remainder of the unit. The sealing plate 100 is releasably mounted on the ledge 24, and is circular in shape with an outer edge 102 that is triangular in shape to extend outwardly from a top surface 104 to a bottom surface 106. The maximum outer diameter of the plate 100 is measured on the bottom surface 104, and this maximum diameter exceeds the diameter of the outer shell 12 adjacent to the ledge. The sealing plate has a thickness dimension measured between the top surface 104 and the bottom surface 106. The triangular shape of the sealing plate matches the triangular shape of the ledge and the thickness of the sealing plate is essentially identical to the thickness of the ledge 24, so that the sealing plate can be fit tightly into the ledge and will remain in place in sealing relation to the unit. A pull ring 110 is mounted on the sealing plate by a flexible neck 112 and is used to remove the sealing plate from engagement with the ledge.

The unit 10' further includes a groove 114 defined in the outer surface of the outer shell 12 adjacent to the rim 20 to engage the shell cover sidewall. The shell cover of the unit 10' also includes an inwardly projecting ring 116 on the weakened section of the cover. The projecting ring 116 fits into the groove 114 to further secure the cover to the rest of the unit. The ring and the shell adjacent to the groove 114 are flexible so that the ring can be pulled out of the groove to release the cover from the outer shell. The sealing plate can be formed of any suitable material, such as aluminum or plastic. A plastic plate is preferred as such a plate can be used several times.

The monolithic nature of the outer shell and the other elements of the unit makes the unit easier and cheaper to manufacture. Expense of manufacture is an important consideration since this is a disposable item.

It is understood that while certain forms of the present invention have been illustrated and described herein, it is not to be limited to the specific forms or arrangements of parts described and shown.

I claim:

1. A disposable container for storing and dispensing pet food comprising:
   (A) a monolithic circular outer shell having
   (1) a base which has an outer dimension,
   (2) a hollow tubular sidewall connected to said base and having an inner surface and an outer surface and a top rim spaced from said base, said top rim having an outer dimension that is greater than said base outer dimension so that said sidewall diverges from said base to form a bowl shape,
   (3) said sidewall being folded over itself at said top rim and having a sidewall portion of said sidewall outer surface in contact with said sidewall inner surface, said sidewall portion extending from said top rim toward said base and having a terminal end located inside said outer shell, and
   (4) said sidewall having an end edge at said terminal end which extends from said outer surface to said inner surface and slopes downwardly from said outer surface toward said base, said terminal end extending completely around said sidewall and defining a ledge, said ledge being triangular in shape with said terminal edge defining a hypotenuse, said ledge having a thickness as measured along the height dimension of said triangular shape;
   (B) adhesive material on said base, said adhesive material having a thickness measured from said base and an outer dimension that is slightly smaller than said base outer dimension, said adhesive material releasably affixing said base to a support upon contact with such support;
   (C) a protective covering having an inner surface releasably attached to said adhesive material and covering said adhesive material, said protective covering having an outer surface and a thickness measured between said protective covering inner surface and said protective covering outer surface, and an outer dimension that exceeds the outer dimension of said adhesive material and is smaller than the outer dimension of said base, said protective covering further including a pull tab mounted on said protective covering outer surface;
   (D) a sealing cover releasably affixed to said outer shell top rim, said sealing cover including
   (1) a top surface,
   (2) a bottom surface,
   (3) said sealing cover having an outer dimension which exceeds the outer dimension of said outer shell adjacent to said top rim,
   (4) adhesive means releasably affixing said sealing cover to said outer shell top rim,
   (5) said sealing cover forming a flexible overhang which is outwardly circumjacent to said outer shell adjacent to said top rim,
   (6) a pull tab mounted on said sealing covering top surface,
   (7) a food stirring element releasably mounted on said sealing cover top surface;
   (E) a monolithic shell cover releasably mounted on said outer shell sidewall in covering relation thereto, said shell cover including
   (1) an inner surface which is located adjacent to said outer shell inner surface when said shell cover is mounted on said shell,
   (2) a base having an inner surface with an inner dimension and an outer surface,
   (3) said shell cover base inner surface inner dimension being slightly smaller than the outer dimension of said outer shell adjacent to said outer shell top rim,
   (4) a flexible tubular sidewall connected to said shell cover base and including
      (a) a first section connected to said shell cover base,
      (b) a connecting section connected to said first section and having an inner dimension that is smaller than said outer shell outer dimension adjacent to said outer shell top rim,
      (c) a third section connected to said connecting section,
      (d) said connecting section being located to engage said outer shell adjacent to said outer shell top rim when said shell cover is mounted on said outer shell and flexing outwardly to accommodate said outer shell, and
      (e) said shell cover tubular sidewall second section curving away from said shell sidewall and having an outer rim which is spaced from said outer shell sidewall when said shell cover is mounted on said outer shell, and
   (5) an annular ridge on said shell cover base outer surface, said annular ridge including
      (a) a planar top surface spaced from said shell cover base outer surface,
      (b) a sloping wall extending from said planar top surface to said shell cover base outer surface and circumscribing an area therewithin on said shell cover base outer surface, said area having a dimension that is slightly greater than the outer dimension of said protective covering,
      (c) said annular ridge having a height measured between said planar top surface and said cover base outer surface, and
      (d) said annular ridge height exceeding the combined thickness of said adhesive and said protective covering; and
   (F) a sealing plate which includes
   (1) an upper surface having an outer dimension,
   (2) a lower surface having an outer dimension, with said lower surface outer dimension exceeding said upper surface outer dimension,
   (3) an edge connecting said upper surface to said lower surface, said edge being triangular in shape and being received in said outer shell ledge when said sealing plate is mounted on said outer shell,
   (4) a pull ring element mounted on said sealing plate upper surface,
   (5) said sealing plate lower surface outer dimension being less than the dimension of said outer shell adjacent to said ledge, and
   (6) said sealing plate having a thickness measured between said sealing plate upper surface and said sealing plate lower surface, with said sealing plate thickness being equal to said ledge thickness.

2. A disposable container for storing and dispensing pet food comprising:
   (A) a monolithic circular outer shell having
   (1) a base which has an outer dimension,
   (2) a hollow tubular sidewall connected to said base and having an inner surface and an outer surface and a top rim spaced from said base, said top rim having an outer dimension that is greater than said base outer dimension so that said sidewall diverges from said base to form a bowl shape, (3) said sidewall being folded over itself at said top rim and having a sidewall portion of said sidewall outer surface in contact with said sidewall inner surface, said sidewall portion extending from said top rim toward said base and having a terminal end located inside said outer shell, and (4) said sidewall having an end edge at said terminal end which extends from said outer surface to said inner surface and slopes downwardly from said outer surface toward said base, said terminal end extending completely around said sidewall and defining a ledge, said ledge being triangular in shape with said terminal edge defining a hypotenuse, said ledge having a thickness as measured along the height dimension of said triangular shape;

(B) adhesive material on said base, said adhesive material having a thickness measured from said base and an outer dimension that is slightly smaller than said base outer dimension, said adhesive material releasably affixing said base to a support upon contact with such support;

(C) a protective covering having an inner surface releasably attached to said adhesive material and covering said adhesive material, said protective covering having an outer surface and a thickness measured between said protective covering inner surface and said protective covering outer surface, and an outer dimension that exceeds the outer dimension of said adhesive material and is smaller than the outer dimension of said base, said protective covering further including a pull tab mounted on said protective covering outer surface;

(D) a sealing cover releasably affixed to said outer shell top rim, said sealing cover including
 (1) a top surface,
 (2) a bottom surface,
 (3) said sealing cover having an outer dimension which exceeds the outer dimension of said outer shell adjacent to said top rim,
 (4) adhesive means releasably affixing said sealing cover to said outer shell top rim,
 (5) said sealing cover forming a flexible overhang which is outwardly circumjacent to said outer shell adjacent to said top rim,
 (6) a pull tab mounted on said sealing covering top surface,
 (7) a food stirring element releasably mounted on said sealing cover top surface;

(E) a monolithic shell cover releasably mounted on said outer shell sidewall in covering relation thereto, said shell cover including
 (1) an inner surface which is located adjacent to said outer shell inner surface when said shell cover is mounted on said shell,
 (2) a base having an inner surface with an inner dimension and an outer surface,
 (3) said shell cover base inner surface inner dimension being slightly smaller than the outer dimension of said outer shell adjacent to said outer shell top rim,
 (4) a flexible tubular sidewall connected to said shell cover base and including
  (a) a first section connected to said shell cover base,
  (b) a connecting section connected to said first section and having an inner dimension that is smaller than said outer shell outer dimension adjacent to said outer shell top rim,
  (c) a third section connected to said connecting section,
  (d) said connecting section being located to engage said outer shell adjacent to said outer shell top rim when said shell cover is mounted on said outer shell and flexing outwardly to accommodate said outer shell, and
  (e) said shell cover tubular sidewall second section curving away from said shell sidewall and having an outer rim which is spaced from said outer shell sidewall when said shell cover is mounted on said outer shell, and
 (5) an annular ridge on said shell cover base outer surface, said annular ridge including
  (a) a planar top surface spaced from said shell cover base outer surface,
  (b) a sloping wall extending from said planar top surface to said shell cover base outer surface and circumscribing an area therewithin on said shell cover base outer surface, said area having a dimension that is slightly greater than the outer dimension of said protective covering,
  (c) said annular ridge having a height measured between said planar top surface and said cover base outer surface, and
  (d) said annular ridge height exceeding the combined thickness of said adhesive and said protective covering;

(F) a sealing plate which includes
 (1) an upper surface having an outer dimension,
 (2) a lower surface having an outer dimension, with said lower surface outer dimension exceeding said upper surface outer dimension,
 (3) an edge connecting said upper surface to said lower surface, said edge being triangular in shape and being received in said outer shell ledge when said sealing plate is mounted on said outer shell,
 (4) a pull ring element mounted on said sealing plate upper surface,
 (5) said sealing plate lower surface outer dimension being less than the dimension of said outer shell adjacent to said ledge, and
 (6) said sealing plate having a thickness measured between said sealing plate upper surface and said sealing plate lower surface, with said sealing plate thickness being equal to said ledge thickness; and (G) a groove defined in said outer shell adjacent to said outer shell top rim, said shell cover sidewall connecting section including a projection which is received in said groove when said shell cover is mounted on said outer shell.

* * * * *